United States Patent [19]

Andersson et al.

[11] Patent Number: 5,002,985

[45] Date of Patent: Mar. 26, 1991

[54] FLAT OR SEMI-FLAT WATER PAINT COMPOSITION HAVING IMPROVED RHEOLOGY-AND PERFORMANCE-PROPERTIES COMPRISING A WATER SOLUBLE NONIONIC CELLULOSE ETHER AND AN ASSOCIATIVE POLYURETHANE THICKENER AND A METHOD FOR THE PREPARATION THEREOF

[75] Inventors: Johan Andersson, Uddevalla; Ingemar Ingvarsson, Stenungsund, both of Sweden

[73] Assignee: Berol Nobel Stenungsund AB, Stenungsund, Sweden

[21] Appl. No.: 337,751

[22] Filed: Apr. 13, 1989

[30] Foreign Application Priority Data

Apr. 28, 1988 [SE] Sweden ................................ 8801594

[51] Int. Cl.$^5$ ................................................ C08L 1/28
[52] U.S. Cl. ........................................ 524/42; 524/43; 524/44; 524/46

[58] Field of Search ......................... 524/42, 43, 44, 46

[56] References Cited

U.S. PATENT DOCUMENTS

| | | | |
|---|---|---|---|
| 3,907,737 | 9/1975 | Marx et al. | 524/46 |
| 4,137,209 | 1/1979 | Wong et al. | 524/44 |
| 4,385,138 | 5/1983 | Sagane et al. | 524/46 |
| 4,775,558 | 10/1988 | Haas et al. | 524/42 |

*Primary Examiner*—Nathan M. Nutter
*Attorney, Agent, or Firm*—Birch, Stewart, Kolasch & Birch

[57] ABSTRACT

A flat or semi-flat water paint composition having improved rheology- and performance-properties prepared by adding a water-soluble nonionic cellulose ether and an associative polyurethane thickener, each being a rheology- and performance-improving agent, to a flat or semi-flat water paint composition, wherein the weight ratio of the associative polyurethane thickener to the water-soluble nonionic cellulose ether is 2:8–8:2.

19 Claims, No Drawings

FLAT OR SEMI-FLAT WATER PAINT COMPOSITION HAVING IMPROVED RHEOLOGY- AND PERFORMANCE-PROPERTIES COMPRISING A WATER SOLUBLE NONIONIC CELLULOSE ETHER AND AN ASSOCIATIVE POLYURETHANE THICKENER AND A METHOD FOR THE PREPARATION THEREOF

The present invention relates to a method for preparing a flat or semi-flat water paint composition having improved rheology- and performance-properties comprising adding to a flat or semi-flat water paint composition, a water-soluble nonionic cellulose ether and an associative polyurethane thickener, each being added as rheology- and performance-improving agents.

In the preparation of flat or semi-flat water paint composition, it is customary to use cellulose ethers as thickeners. Cellulose ethers are advantageous in that they produce the desired effect at a low cost and yield a good texture (grain). The viscosity-increasing effect is relatively unaffected by additives, such as tinting colorants. On the other hand, with increasing molecular weights cellulose ethers give relatively low viscosities at high shear rates, and poor levelling, which results inadequate hiding power.

It has therefore been suggested to replace the cellulose ethers with an associative thickener of the polyurethane type. It is true that the associative polyurethanes give improved viscosity at high shear rates, but they also give a poor texture (grain), which is linked with extreme levelling. The associative polyurethanes therefore have not been commonly used as rheology- and performance-improving agents for flat or semi-flat paints.

It has now been found that flat and semi-flat water paints with excellent properties can be obtained at low costs by combining a nonionic water-soluble cellulose ether with an associative polyurethane thickener, the weight ratio of polyurethane thickener and cellulose ether being 2:8–8:2. In the present context, "flat and semi-flat" paint compositions relate to paint compositions having a pigment volume concentration of at least 30%. By combining a nonionic water-soluble cellulose ether with an associative polyurethane thickener, it has proved to be possible to essentially maintain the positive characteristics of the two components while suppressing their negative characteristics.

In the present context, "associative polyurethane thickener" relates to a polymer containing at least 2, preferably 3 or more hydrophobic groups having 6–30 carbon atoms with intermediate hydrophilic polyether segments, the hydrophobic groups and the hydrophilic segments being interlinked to an essential extent by urethane bonds. They generally have a molecular weight of 10,000–250,000, preferably 15,000–100,000. A large number of such compounds are known and described, e.g. in U.S. Pat. Nos. 2,946,767, and 4,079,028 and European Patent Publication No. 96,882, of which relevant portions are included by reference in the present specification.

The water-soluble nonionic cellulose ether may have both alkyl substituents and hydroxyalkyl substituents or combinations thereof. Typical examples of suitable nonionic cellulose derivatives are methylcellulose, methylhydroxyethylcellulose, methylhydroxypropylcellulose, hydroxyethylcellulose, hydroxyethylhydroxypropylcellulose, hydroxyethylhydroxybutylcellulose, ethylhydroxyethylcellulose and propylhydroxyethylcellulose. The above-mentioned cellulose ethers may also contain a minor amount of hydrocarbon substituents having 4–20 carbon atoms, such as benzyl, dodecyl, octyl and decyl substituents, provided the cellulose ethers become water-soluble. Preferred cellulose ethers are such ethers as contain an alkyl group, such as a methyl or an ethyl group. The nonionic cellulose ethers preferably have a viscosity of 5,000–150,000 mPa.s in a 2% aqueous solution measured on a Brookfield viscometer. A suitable flocculation temperature is 50°–80° C.

The positive effects of the present invention have been observed on paint compositions based on the number of binders which differ essentially from each other. Suitable binders are alkyd resins and latex binders, such as polyvinylacetate, polyacrylate, copolymers of vinylacetate and acrylate, copolymers of vinylacetate and ethylene, copolymers of vinylacetate, ethylene and vinylchloride and copolymers of styrene and acrylate.

The present invention is further illustrated by the following Example.

EXAMPLE 1

A flat indoor paint composition having a pigment volume concentration of 46% and a dry solids content of 54% by weight and containing 25% by weight of a polyacrylate binder, Rhoplex AC-64, alternatively a binder consisting of a copolymer of vinylacetate and acrylate, UCAR 367, was admixed with one of the additives stated below in such amounts that the paint composition had a viscosity of 122 KU at low shear rates measured according to ASTM C 562-81. The following results were obtained. The indicated amounts relate to the active content.

TABLE 1

| Additive | Amount, % by weight of paint | |
|---|---|---|
| | Acrylic binder | Vinyl-acrylic binder |
| 1. Polyurethane A[1/] | 0.67 | 0.72 |
| 2. Ethylhydroxyethylcellulose B[2/] | 0.63 | 0.64 |
| Polyurethane A | 0.20 | 0.20 |
| 3. Ethylhydroxyethylcellulose C[3/] | 0.49 | 0.50 |
| Polyurethane A | 0.20 | 0.20 |
| 4. Ethylhydroxyethylcellulose B | 0.41 | 0.50 |
| Polyurethane A | 0.40 | 0.40 |
| 5. Ethylhydroxyethylcellulose C | 0.32 | 0.38 |
| Polyurethane A | 0.40 | 0.40 |
| 6. Hydroxypropylmethylcellulose F[4/] | 0.70 | — |
| Polyurethane A | 0.20 | — |
| 7. Hydroxypropylmethylcellulose F | 0.50 | — |
| Polyurethane A | 0.40 | — |
| 8. Ethylhydroxyethylcellulose B | 0.50 | — |
| Polyurethane D[5/] | 0.20 | — |
| 9. Ethylhydroxyethylcellulose B | 0.35 | — |
| Polyurethane D | 0.40 | — |
| 10. Ethylhydroxyethylcellulose B | 0.55 | — |
| Polyurethane E[6/] | 0.20 | — |
| 11. Ethylhydroxyethylcellulose B | 0.40 | — |
| Polyurethane E | 0.40 | — |
| 12. Hydroxyethylcellulose G[7/] | — | 0.64 |
| Polyurethane A | — | 0.20 |
| 13. Hydroxyethylcellulose G | — | 0.50 |
| Polyurethane A | — | 0.40 |
| 14. Hydroxyethylcellulose H[8/] | — | 0.50 |
| Polyurethane A | — | 0.20 |
| 15. Hydroxyethylcellulose H | — | 0.38 |

TABLE 1-continued

| | Amount, % by weight of paint | |
|---|---|---|
| Additive | Acrylic binder | Vinyl-acrylic binder |
| Polyurethane A | — | 0.40 |

Explanatory note - Table 1
[1] Polyurethane A (BERMODOL PUR 2100) is an associative polyurethane thickener containing two major hydrophobic hydrocarbon groups and hydrophilic polyether chains. Viscosity is 1500 mPa.s (Brookfield) at 12 rpm and dry solids content 35% by weight.
[2] Ethylhydroxyethylcellulose B (BERMOCOLL E 411 FQ) has a flocculation temperature of about 70° C. and a viscosity in 2% solution of 12,000 mPa.s (Brookfield) at 12 rpm.
[3] Ethylhydroxyethylcellulose C (BERMOCOLL E 481 FQ) has a flocculation temperature of about 70° C. and a viscosity in 2% solution of 80,000 mPa.s (Brookfield) at 6 rpm.
[4] Hydroxypropylmethylcellulose F (Methocel J5MS) has a gelling temperature of 56° C. and a viscosity of 5,000 mPa.s (Ubbelohde) in 2% solution.
[5] Polyurethane D (Acrysol RM-825) is an associative polyurethane thickener and has a viscosity of 1,000-2,500 mPa.s (Brookfield) and a dry solids content of 25% by weight.
[6] Polyurethane E (UCAR SCT-270) is an associative polyurethane thickener and has a viscosity of 6,000-10,000 mPa.s (Brookfield) and a dry solids content of 20% by weight.
[7] Hydroxyethylcellulose G (Cellosize QP 4400) has a flocculation temperature of >100° C. and a viscosity in 2% solution of 4,800-6,000 mPa.s at 60 rpm (Brookfield).
[8] Hydroxyethylcellulose H (Natrosol 250 HHR) has a flocculation temperature of >100° C. and a viscosity in 2% solution of about 100,000 mPa.s at 6 rpm (Brookfield).

The different paints were then tested for levelling according to ASTM D4062-81, the following results being obtained.

TABLE 2

| | Levelling | |
|---|---|---|
| Additive | Acrylic binder | Vinyl-acrylic binder |
| 1 | 10 | 9 |
| 2 | 5 | 2 |
| 3 | 3 | 2 |
| 4 | 8 | 3 |
| 5 | 7 | 4 |
| 6 | 2 | — |
| 7 | 5 | — |
| 8 | 3 | — |
| 9 | 6 | — |
| 10 | 3 | — |
| 11 | 5 | — |
| 12 | — | 2 |
| 13 | — | 3 |
| 14 | — | 2 |
| 15 | — | 3 |

A levelling value of 3-6 gives a suitable texture for a flat or semi-flat paint composition. A levelling value of 9 or 10 indicates excellent levelling which is however not desirable for flat or semi-flat paint because of the resulting unsatisfactory texture. From the results appears that additives 2-15 according to the present invention, all of which have the same viscosity at low shear rates, have a levelling value essentially better adapted to flat and semi-flat paint compositions than when polyurethane alone is used as thickener.

EXAMPLE 2

The same paint compositions as in Example 1 were admixed with additives 1, 4, 7, 9, 11, 13 or 15 according to Example 1 and 5% by weight, based on the weight of the paint composition, of any of the tinting colorants Colortrend Thalo Blue and Colortrend Lamp Black. The viscosity was thereafter determined at low shear rates. The following results were obtained.

TABLE 3

| | Viscosity, KU | | | |
|---|---|---|---|---|
| | Acrylic binder | | Vinyl-acrylic binder | |
| Additive | Thalo Blue | Lamp Black | Thalo Blue | Lamp Black |
| 1 | 86 | 97 | 112 | 138 |
| 4 | 92 | 100 | 114 | 120 |
| 7 | 108 | 108 | — | — |
| 9 | 109 | 109 | — | — |
| 11 | 101 | 109 | — | — |
| 13 | — | — | 123 | 125 |
| 15 | — | — | 120 | 125 |

The viscosities obtained should be compared with 122 KU, which was the viscosity of the paint compositions without the addition of a tinting colorant. From the results appears that the changes in viscosity are considerably less for additives 4, 7, 9, 11, 13 and 15 according to the present invention than for reference additive 1.

EXAMPLE 3

The same flat paint compositions as in Example 1 were admixed with one of the additives stated below in such amounts that they had the same viscosity at low shear rates. The components are the same as in Example 1.

TABLE 4

| | Added amount, % by weight of paint | |
|---|---|---|
| Additive | Acrylic binder | Vinyl-acrylic binder |
| 1. Ethylhydroxyethylcellulose B | 0.86 | 0.80 |
| 2. Ethylhydroxyethylcellulose C | 0.67 | 0.58 |
| 3. Ethylhydroxyethylcellulose B | 0.63 | 0.64 |
|     Polyurethane A | 0.20 | 0.20 |
| 4. Ethylhydroxyethylcellulose B | 0.41 | 0.50 |
|     Polyurethane A | 0.40 | 0.40 |
| 5. Ethylhydroxyethylcellulose C | 0.49 | 0.50 |
|     Polyurethane A | 0.20 | 0.20 |
| 6. Ethylhydroxyethylcellulose C | 0.32 | 0.38 |
|     Polyurethane A | 0.40 | 0.40 |
| 7. Hydroxypropylmethylcellulose F | 0.70 | — |
|     Polyurethane A | 0.20 | — |
| 8. Hydroxypropylmethylcellulose F | 0.50 | — |
|     Polyurethane A | 0.40 | — |
| 9. Ethylhydroxyethylcellulose B | 0.50 | — |
|     Polyurethane D | 0.20 | — |
| 10. Ethylhydroxyethylcellulose B | 0.35 | — |
|     Polyurethane D | 0.40 | — |
| 11. Ethylhydroxyethylcellulose B | 0.55 | — |
|     Polyurethane E | 0.20 | — |
| 12. Ethylhydroxyethylcellulose B | 0.40 | — |
|     Polyurethane E | 0.40 | — |
| 13. Hydroxyethylcellulose G | — | 0.64 |
|     Polyurethane A | — | 0.20 |
| 14. Hydroxyethylcellulose G | — | 0.50 |
|     Polyurethane A | — | 0.40 |
| 15. Hydroxyethylcellulose H | — | 0.50 |
|     Polyurethane A | — | 0.20 |
| 16. Hydroxyethylcellulose H | — | 0.38 |
|     Polyurethane A | — | 0.40 |

The compositions obtained, all of which had a viscosity of 122 KU at low shear rates, were then tested for viscosity at high shear rates using an ICI viscometer. The following results were obtained.

TABLE 5

| | Viscosity, ICI, Poise | |
|---|---|---|
| Additive | Acrylic binder | Vinyl-acrylic binder |
| 1 | 1.4 | 1.8 |
| 2 | 1.2 | 1.6 |

TABLE 5-continued

| | Viscosity, ICI, Poise | |
|---|---|---|
| Additive | Acrylic binder | Vinyl-acrylic binder |
| 3 | 1.6 | 1.8 |
| 4 | 1.8 | 2.0 |
| 5 | 1.4 | 1.7 |
| 6 | 1.6 | 1.8 |
| 7 | 2.0 | — |
| 8 | 2.0 | — |
| 9 | 1.6 | — |
| 10 | 2.1 | — |
| 11 | 1.8 | — |
| 12 | 2.1 | — |
| 13 | — | 1.9 |
| 14 | — | 2.0 |
| 15 | — | 1.6 |
| 16 | — | 1.8 |

From the results appears that in those cases where the cellulose ethers gave a viscosity which was relatively low at high shear rates, it was possible to notably improve the viscosity by adding an associative polyurethane thickener without any change of the viscosity at low shear rates.

We claim:

1. A method for preparing a flat or semi-flat water paint composition having improved rheology- and performance-properties comprising adding a water-soluble nonionic cellulose ether and an associative polyurethane thickener, each being a rheology- and performance-improving agent, to a flat or semi-flat water paint composition, wherein the weight ratio of the associated polyurethane thickener to the water-soluble nonionic cellulose ether is 2:8–8:2.

2. The method as claimed in claim 1, wherein the water-soluble nonionic cellulose ether has a viscosity of 5,000–150,000 mPa.s in a 2% aqueous solution at 12 rpm.

3. The method as claimed in claim 1 or 2, wherein the water-soluble nonionic cellulose ether contains an alkyl group.

4. The method as claimed in claim 1 or 2, wherein the associative polyurethane thickener contains at least 3 hydrophobic groups having 6–30 carbon atoms with intermediate hydrophilic polyether segments, the hydrophobic groups and the hydrophilic segments being interlinked to a substantial extent by urethane bonds.

5. The method as claimed in claim 1 or 2, wherein the associative polyurethane has a molecular weight of 10,000–250,000.

6. The method as claimed in claim 1 or 2, wherein the flat or semi-flat water paint composition contains a latex binder.

7. The method as claimed in claim 1 or 2, wherein the flat or semi-flat water paint composition to which the improving agent is added, further comprises at least 30% by volume concentration of a pigment.

8. A flat or semi-flat water paint composition having improved rheology- and perfromance-properties, comprising a flat or semi-flat water paint composition, a water-soluble nonionic cellulose ether and an associative polyurethane thickener, each being a rheology- and performance-improving agent, wherein the weight ratio of the associative polyurethane thickener to the water-soluble nonionic cellulose ether is 2:8–8:2.

9. The flat or semi-flat water paint composition having improved rheology- and performance-properties as claimed in claim 7, wherein the water-soluble nonionic cellulose ether has a viscosity of 5,000–150,000 mPa.s in a 2% aqueous solution at 12 rpm.

10. The flat or semi-flat water paint composition having improved rheology- and performance-properties as claimed in claim 7, wherein the water-soluble nonionic cellulose ether contains an alkyl group.

11. The flat or semi-flat water paint composition having improved rheology- and performance-properties as claimed in. claim 7, wherein the associative polyurethane thickener contains at least 3 hydrophobic groups having 6–30 carbon atoms with intermediate hydrophilic polyether segments, the hydrophobic groups and the hydrophilic segments being interlinked to a substantial extent by urethane bonds.

12. The flat or semi-flat water paint composition having improved rheology- and performance-properties as claimed in claim 7, wherein the associative polyurethane has a molecular weight of 10,000–250,000.

13. The flat or semi-flat water paint composition having improved rheology- and performance-properties as claimed in claim 7, wherein the flat or semi-flat water paint composition contains a latex binder.

14. The flat or semi-flat water paint composition having improved rheology- and performance-properties as claimed in claim 7, which further comprises at least 30% by volume concentration of a pigment.

15. The flat or semi-flat water paint composition having improved rheology- and performance-properties as claimed in claim 8, wherein the water-soluble nonionic cellulose ether contains an alkyl group.

16. The flat or semi-flat water paint composition having improved rheology- and performance-properties as claimed in claim 8, wherein the associative polyurethane thickener contains at least 3 hydrophobic groups having 6–30 carbon atoms with intermediate hydrophilic polyether segments, the hydrophobic groups and the hydrophilic segments being interlinked to a substantial extent by urethane bonds.

17. The flat or semi-flat water paint composition having improved rheology- and performance-properties as claimed in claim 8, wherein the associative polyurethane has a molecular weight of 10,000–250,000.

18. The flat or semi-flat water paint composition having improved rheology- and performance-properties as claimed in claim 8, wherein the flat or semi-flat water paint composition contains a latex binder.

19. The flat or semi-flat water paint composition having improved rheology- and performance-properties as claimed in claim 8, which further comprises at least 30% by volume concentration of a pigment.

* * * * *